(12) United States Patent
McDougal et al.

(10) Patent No.: US 9,882,924 B2
(45) Date of Patent: Jan. 30, 2018

(54) SYSTEMS AND METHODS FOR MALWARE ANALYSIS OF NETWORK TRAFFIC

(71) Applicant: Forcepoint LLC, Austin, TX (US)

(72) Inventors: Monty D. McDougal, St. Paul, TX (US); John S. Lear, Purcellville, VA (US); Julian A. Zottl, Ashburn, VA (US); Jesse J. Lee, McKinney, TX (US)

(73) Assignee: Forcepoint LLC, Herndon, VA (US)

( * ) Notice: Subject to any disclaimer, the term of this patent is extended or adjusted under 35 U.S.C. 154(b) by 15 days.

(21) Appl. No.: 15/063,705

(22) Filed: Mar. 8, 2016

(65) Prior Publication Data

US 2016/0269437 A1    Sep. 15, 2016

Related U.S. Application Data

(60) Provisional application No. 62/131,941, filed on Mar. 12, 2015.

(51) Int. Cl.
*H04L 29/06* (2006.01)
*H04L 12/58* (2006.01)

(52) U.S. Cl.
CPC .......... *H04L 63/1433* (2013.01); *H04L 51/08* (2013.01); *H04L 51/12* (2013.01); *H04L 63/145* (2013.01); *H04L 63/0428* (2013.01); *H04L 63/1416* (2013.01)

(58) Field of Classification Search
CPC ............ H04L 63/1433; H04L 63/1466; H04L 63/1416; H04L 63/0236; H04L 63/145; H04L 63/1408; H04L 63/14; H04L 63/1425; H04L 63/0428; H04L 51/08; H04L 51/12

USPC .......................................................... 726/23
See application file for complete search history.

(56) References Cited

U.S. PATENT DOCUMENTS

| | | | | |
|---|---|---|---|---|
| 7,849,506 B1 * | 12/2010 | Dansey | ................ | H04L 49/208 713/188 |
| 8,667,590 B1 * | 3/2014 | Lee | ....................... | G06F 21/564 713/188 |
| 8,689,333 B2 * | 4/2014 | Aziz | ................... | G06F 9/45537 726/24 |
| 8,996,691 B1 * | 3/2015 | Stickle | .............. | H04L 12/40071 709/224 |
| 2005/0132230 A1 * | 6/2005 | Miclea | ................ | H04L 63/1408 726/4 |

(Continued)

*Primary Examiner* — Syed Zaidi
(74) *Attorney, Agent, or Firm* — Schwegman Lundberg & Woessner, P.A.

(57) ABSTRACT

Generally discussed herein are systems, devices, and methods for malware analysis. In one or more embodiments, a method can include copying application layer data traffic to create copied application layer data traffic, forwarding at least a portion of the application layer data traffic to a destination client prior to a malware analysis of corresponding copied application layer data traffic, determining whether the copied application layer data traffic includes a specified property, and in response to a determination that the copied application layer data traffic includes the specified property, storing the copied application layer data traffic determined to include the specified property for subsequent malware analysis, the stored copied application layer data traffic including context data of the copied application layer data traffic.

20 Claims, 4 Drawing Sheets

(56) References Cited

U.S. PATENT DOCUMENTS

| | | | |
|---|---|---|---|
| 2006/0206936 A1* | 9/2006 | Liang | H04L 63/1416 726/22 |
| 2009/0158407 A1* | 6/2009 | Nicodemus | H04L 63/20 726/6 |
| 2012/0151585 A1* | 6/2012 | Lamastra | H04L 51/12 726/24 |
| 2012/0233311 A1* | 9/2012 | Parker | H04L 43/00 709/224 |
| 2015/0007317 A1* | 1/2015 | Jain | H04L 63/0227 726/23 |
| 2015/0113629 A1* | 4/2015 | Park | H04L 63/02 726/13 |

* cited by examiner

SYSTEMS AND METHODS FOR MALWARE ANALYSIS OF NETWORK TRAFFIC

RELATED APPLICATION

This patent application claims the benefit of priority to U.S. Provisional Patent Application Ser. No. 62/131,941, titled "SYSTEMS AND METHODS FOR MALWARE ANALYSIS OF NETWORK TRAFFIC" filed on Mar. 12, 2015, which is hereby incorporated by reference herein in its entirety.

TECHNICAL FIELD

Discussed herein are systems and methods for malware analysis of network data traffic, such as can include electronic mail (email) traffic. Some embodiments relate more specifically to malware analysis of email traffic and a corresponding email attachment.

BACKGROUND

Malware commonly enters a network enterprise through a number of vectors. One such vector is electronic mail (email). A challenge with malware analysis is figuring out a sufficient way to get access to potentially malicious content for scanning, such as without affecting network speed or other network traffic. One approach is using a man-in-the-middle (inline) mail transfer agent (MTA). In an inline approach, the email traffic is buffered. The buffered email is analyzed for malware and forwarded to a user only after passing malware analysis. Such an inline approach adds a delay between email receipt at the network and the email showing up in a user's inbox, regardless of whether the email includes malware. Time-sensitive emails can be delayed too long using an inline approach. Analyzing every email can be cumbersome and unduly tax computation resources.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1A:
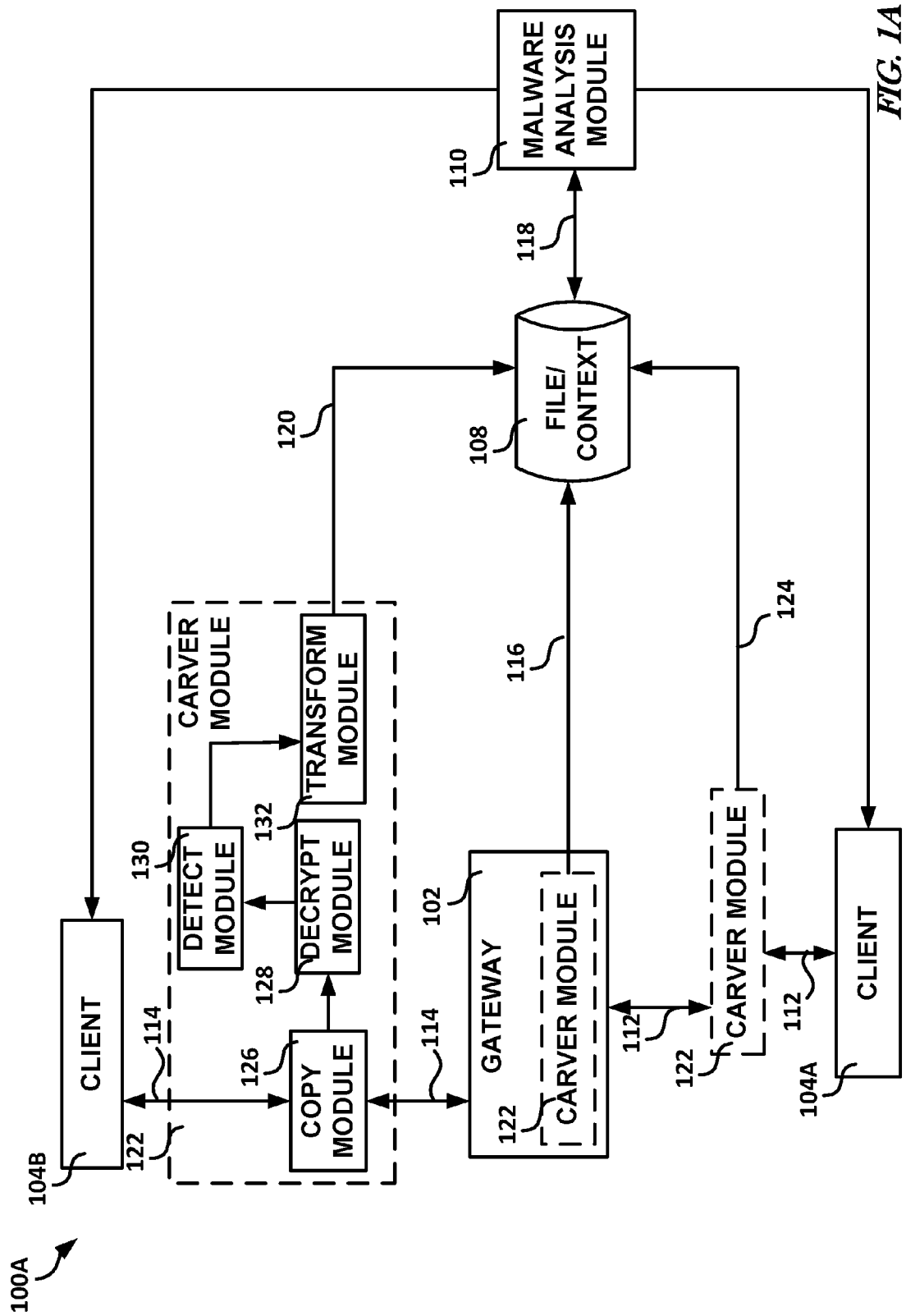
FIG. 1A illustrates, by way of example, a logical block diagram of an embodiment of a system for malware analysis of network traffic.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments in this disclosure generally regard malware analysis of network data traffic, such as internet or email traffic. Some embodiments relate more specifically to malware analysis of email traffic and/or a corresponding email attachment.

Email and web threats remain a significant attack vector used by Advanced Persistent Threats (APTs). Being able to detect a malware attack, such as an attack embedded in a file transmitted over the internet (e.g., as an internet download or an email attachment, among others), is a key capability missing in most enterprises. Being able to do this detection at a sufficient rate for arbitrary types of network traffic without slowing network traffic can help reduce the malware threat while not affecting user bandwidth expectations. Being able to do advanced (behavioral) detection on web traffic provides a means to better protect a system from malware.

An approach to malware analysis includes passively analyzing network traffic. In one or more embodiments, the network traffic can be analyzed as it is received, such as by analyzing the traffic for a specific sequence of data that indicates the traffic is a type of traffic that can include malware. For example, files (e.g., documents, such as a Microsoft® document, such as an Excel® file, Word, PowerPoint, Visio, or other document, a portable data format (PDF) file, or other file that can include a macro embedded therein, programs (executable files), emails, attachments to emails, or other files) can include malicious code embedded therein. These files can be detected by searching for a string of bits in a network data stream that indicates the data corresponds to the data type. In one or more embodiments, the string of bits can be part of a header of the data stream.

The context of a file is often left out of malware analysis consideration when using a passive approach to malware analysis. For example, consider an example in which the data stream is not copied and data that corresponds to data to be analyzed for malware is pulled out of the stream of network traffic. The context of the data in this example is often left out of the malware analysis because it is much simpler to just pull the content of the file and not pull the context data from the stream.

Context data as used herein means data corresponding to a sender address, a recipient address, a send port/IP address, a receive port/IP address, a sender identity, a recipient identity, a time of transmission, a copy contact, a blind copy contact, a subject line content, a content of the message of the email, an author, time of creation, program used to create the content, attachment(s), server(s) involved in transmission, message identification (ID), domain key identified mail (DKIM) information, character set used, multipurpose internet mail extensions (MIME) information, or other context.

A file carver module as discussed herein has the ability to remove a file from several types of web traffic (e.g., Secure Socket Layer (SSL), Transfer Control Protocol (TCP), Internet Protocol (IP). Transport Layer Security (TLS), or webmail traffic, among others). Email traffic is encoded in such a way that makes it more difficult to extract a context of the email from the traffic without slowing down the network traffic. At least a portion of the context of the email (e.g., a sender identity, a recipient identity, a time of transmission, a copy contact, a blind copy contact, a subject line content, a content of the message of the email, or other context) can be copied from the network traffic, along with the content of the email (e.g., a body, subject line, and/or an attachment).

The traffic and/or its context can be converted to a format used by a database (e.g., a Message Transfer Agent (MTA) to store an email or other database format). The extracted traffic can be converted to and saved in the database format, such that it can be processed by tools that operate on data in the database format. A malware analysis module can perform a malware analysis on such data. Such systems and methods provide the ability to passively collect emails (e.g., attachment(s) and/or the email context) off the wire, such as without acting inline as an email proxy or an MTA.

The systems and methods discussed herein can provide the ability to: 1) copy a file and associated context data from arbitrary network traffic to then pass to a malware analysis module for malware analysis (e.g., signature analysis, hash analysis, behavioral analysis, and/or heuristic analysis), 2) copy a full network data context from the traffic in addition to the files, such that analysts have the full context of the traffic and not just the content, 3) take both attachments and full network traffic data context into an advanced malware analysis module passively (e.g., without affecting the speed of the web traffic), and 4) handle malware analysis of the full network data content and context passively vs. inline.

One or more of the systems and methods discussed herein can provide both a file and the context to allow an analyst to know not only that a file has been sent, but also to whom, from whom, and/or when, among other possible context data. Such context data can affect the final conclusion of a malware analysis. The data extracted from the traffic can be converted to a unified format used by a database (e.g., a sendmail queue format), such as for convenient storage and analysis. This context data can help inform an analyst's decision as to whether the network traffic includes malware or not.

FIG. 1A illustrates, by way of example, a block diagram of an embodiment of a system 100A for malware analysis. The system 100A as illustrated includes a gateway 102 communicatively coupled between two clients 104A and 104B. The system 100A includes a file/context database 108 communicatively coupled between the gateway 102 and a malware analysis module 110. The system 100A includes a traffic carver module 122 to monitor traffic on a connection 112 or 114, or through the gateway 102. The dashed boxes of the carver module 122 indicate possible locations for the carver module 122. The carver module 122 can be situated to monitor traffic between the gateway 102 and the client 104A (i.e. on the connections 112), traffic between the gateway 102 and the client 104B (i.e. on the connections 114), or traffic through the gateway 102.

The gateway 102 acts as a middleman between the clients 104A-B. The gateway 102 is configured to receive communications (e.g., requests or data in a Transfer Control Protocol (TCP) format) to be sent to another client, such as through connection 112 or 114. TCP can be used for electronic mail (email), file transfer (e.g., using the File Transfer Protocol (FTP), streaming applications, or the World Wide Web (WWW), among others). TCP provides a communication service between an application program and the Internet Protocol (IP). TCP provides host-to-host connectivity at a transport layer.

The transport layer provides host-to-host communication services for applications (the application layer), data stream support, reliability, flow control, and multiplexing. The transport layer manages data transfer between an application layer and a network layer. The transport layer can perform host-to-host communications (e.g., over same or different hosts). The transport layer can perform communications on a local network or between remote networks, such as can be separated by routers. The transport layer provides a channel for communications of applications. The User Datagram Protocol (UDP) is a basic transport layer protocol, providing an unreliable datagram service. The Transmission Control Protocol provides flow-control, connection establishment, and reliable transmission of data.

The transport layer can communicate with the application layer. The application layer provides services for a user, user applications, and an operating system (OS). The application layer includes the communications protocols and interface methods used in an Internet Protocol (IP) network. The application layer standardizes communications and relies on the transport layer to establish data transfer channels and manage the transfer of data across the channels. For example, a web browser uses HTTP services provided by the application layer, an email client uses SMTP services provided by the application layer, and so on.

The application layer is the layer within which applications create user data and communicate this data to other applications on another or the same host. The applications, or processes, make use of the services provided by the underlying, lower layers, especially the transport layer which provides reliable or unreliable data transfers to other processes.

The transport layer can communicate with a network layer. The network layer is responsible for routing data between clients. The network layer recognizes and forwards transport layer incoming messages after packaging the transport layer messages with proper network address information.

The internet layer exchanges datagrams across network boundaries. The gateway 102 provides an interface to the internet layer. The internet layer establishes internetworking and defines and establishes the Internet. This layer defines the addressing and routing structures used for the TCP/IP protocol suite. The primary protocol in this scope is the IP. The network layer function is routing to transport datagrams to a next IP router that has the connectivity to a network closer to a final destination IP address.

The gateway 102 is configured to route a request or a response to a request to the proper client 104A-B. The client 104A-B generally responds by providing the requested content to the gateway 102 or providing some indication as to why the content is not provided.

The client 104A-B can include a web browser or an email application that connects to the gateway 102 to retrieve content from an application. The client 104A-B can be one of many clients connected to the gateway 102 via a network connection (e.g., the connection 112 or 114).

The carver module 122 monitors traffic on the connections 112, 114, or through the gateway 102. The carver module 122 as illustrated includes a copy module 126, a decrypt module 128, a detect module 130, and a transform module 132. Only one of the carver modules 122 is illustrated as having these modules so as to not obscure the illustration.

The copy module 126 copies data in a data stream from the client 104B or 104A or the gateway 102. A copy of the data is provided to the detect module 130 and another copy of the data is forwarded to the destination (e.g., the client 104A-B). An uncopied version of the data stream can continue to its destination. The uncopied data stream can reach the destination client before malware analysis.

The decrypt module 128 can decrypt data, such as SSL or TLS data, such as to help determine if the traffic includes a specified property which is being monitored by the detect module 130. The decrypt module 128 can determine if data is encrypted and a type of encryption of the data. If data is not encrypted, the data can be forwarded to the detect module 130. The decrypt module 128 can decrypt data in the stream and forward the decrypted data to the detect module 130.

The copied data stream can be analyzed for specific data patterns that indicate the data corresponds to a specific data type, such as by the detect module 130. For example, a header field of TCP data, SLS data, or TLS data, can indicate the type of data to which a packet of data corresponds. The header field can be compared (with or without decoding) to a list of specified header fields to determine if the data includes a specific property. If the data has the specific property, all of the data including all of the contextual information of the data, sometimes referred to as metadata, can be stored in the file/context database 108, such as after decoding, de-packetizing, and/or transforming the data to a unified format.

The detect module 130 can extract traffic that includes a specific property (e.g., header or portion of a packet that includes specific identifying information or an encoded MIME type). For example, the detect module 130 can monitor the traffic for a file, such as by monitoring for data that identifies an extension of a file. If the extension matches an extension in a list of extensions, the detect module 130 can extract the file from the copied or uncopied traffic. Some common file extensions include, but are not limited to ".exe", ".pdf", ".doc", ".docx", ".ppt", ".pptx", ".txt", ".jpeg", ".img", ".wav", ".png", ".dmg", ".html", ".tar", ".gz", ".gfx", ".mus", ".mp3", ".mp4", ".java", ".vbs", ".c", ".c++", ".xl", ".xls", etc. The detect module 130 can additionally or alternatively monitor for a header or other identification data that indicates that the traffic is email traffic.

A MIME type is information in a header of MIME traffic. MIME is used in Simple Mail Transfer Protocol (SMTP) and HTTP, among others. A MIME header is placed at the beginning of an email or other web transmission. The carver module 122 can use this header (e.g., the content type, media type header, content disposition, or a similar MIME header) to determine the type of content in the transmitted data.

The detect module 130 can extract information regarding the context of the file extracted. For example, if the file was a part of email traffic, the detect module 130 can extract data from the copied traffic that identifies the context of the email communication, such as a sender of the email, a recipient of the email, a copy contact, a blind copy contact, a content of a message of the email, a time the email was sent, an Internet Protocol (IP) address from which the email originated, a content of the subject header of the email (or other header of the email), among other context information.

The optional transform module 132 can convert data into a format compatible with the file/context database 108. The transform module 132 can sessionize data. The header of the data can indicate what the data after the header corresponds to. Sessionizing the data includes organizing the data based on the header information. Either of the detect module 130 and/or transform module 132 can decode and/or decompress data from the data stream.

The database 108, as illustrated, is communicatively coupled between the gateway 102 and the malware analysis module 110. The database 108, in one or more embodiments, can be communicatively coupled between any of the possible carver modules 122 and the malware analysis module 110. The database 108 receives data from the carver module 122. The data received from the carver module 122 can be in a format compatible with the malware analysis module 110, such as a sendmail queue format. Alternatively, the carver module 122 can provide the extracted data to the malware analysis module directly (e.g., in a format compatible with the malware analysis module 110).

In one or more other embodiments, the malware analysis module 110 can perform a malware analysis on data from the carver module 122 and/or the file/context database 108. The malware analysis module 110 can receive data in a specified format, such as a sendmail queue format. The malware analysis module 110 can perform one or more of a signature analysis, a heuristic analysis, a behavioral analysis, and/or a hash analysis on the data received.

A signature analysis includes determining if content includes a specific bit or byte pattern. For example, the bit sequence "1100110011001100" can be associated with malware. The malware analysis module 108 can determine if the content includes that bit sequence, and if it is not detected, the malware analysis module 110 can determine that the content does not include malware based on the signature analysis.

A heuristic analysis is a method of detecting a variant of known malware or a new type of malware. As malware mutates or is changed (e.g., to attack a different system type or to get through malware detection software) the code or signature of the malware changes. Families of malware, however, retain commonalities with other malware in the family. These commonalities can be detected by creating a single signature that encapsulates the similarities between the malware in the family with one or more non-contiguous code identifiers (e.g., wild card characters) where differences between members of the malware family occur. A malware detection scheme can thus detect if content is a member of the family regardless of differing code inserted in place of the wild card(s).

A fuzzy hash analysis includes determining a plurality of hash values (e.g., a checksum, and MD5 hash, an SHA1 hash, or other hash) on portions of the contents and/or metadata of the file and comparing the determined hash value(s) to hash values of a document known to be malware. If a specified number or percentage of the determined hash value(s) matches hash values of a file known to be malware, the file can be determined to include malware. Fuzzy hash analysis can include hashing content of a file in a sliding window or in blocks.

A behavioral analysis includes executing commands of content, such as in an isolated (e.g., virtual) environment and monitoring the commands as they are performed. If the commands performed exhibit typical malware type behavior(s), the content can be considered malware. Behavioral analysis can take a significant amount of time (minutes or even hours) to perform. Thus, delaying a content request from the client 104A-B until behavioral analysis is complete can cause frustration among users.

If the malware analysis module 110 determines that traffic from the carver module 122 includes malware, the malware analysis module 110 can provide a communication to the client 104A-B. The communication can indicate to the client 104A-B what data (e.g., file(s)) include malware and/or a remedial action to be taken to fix any issues that may have been caused by the malware.

Figure 1B:
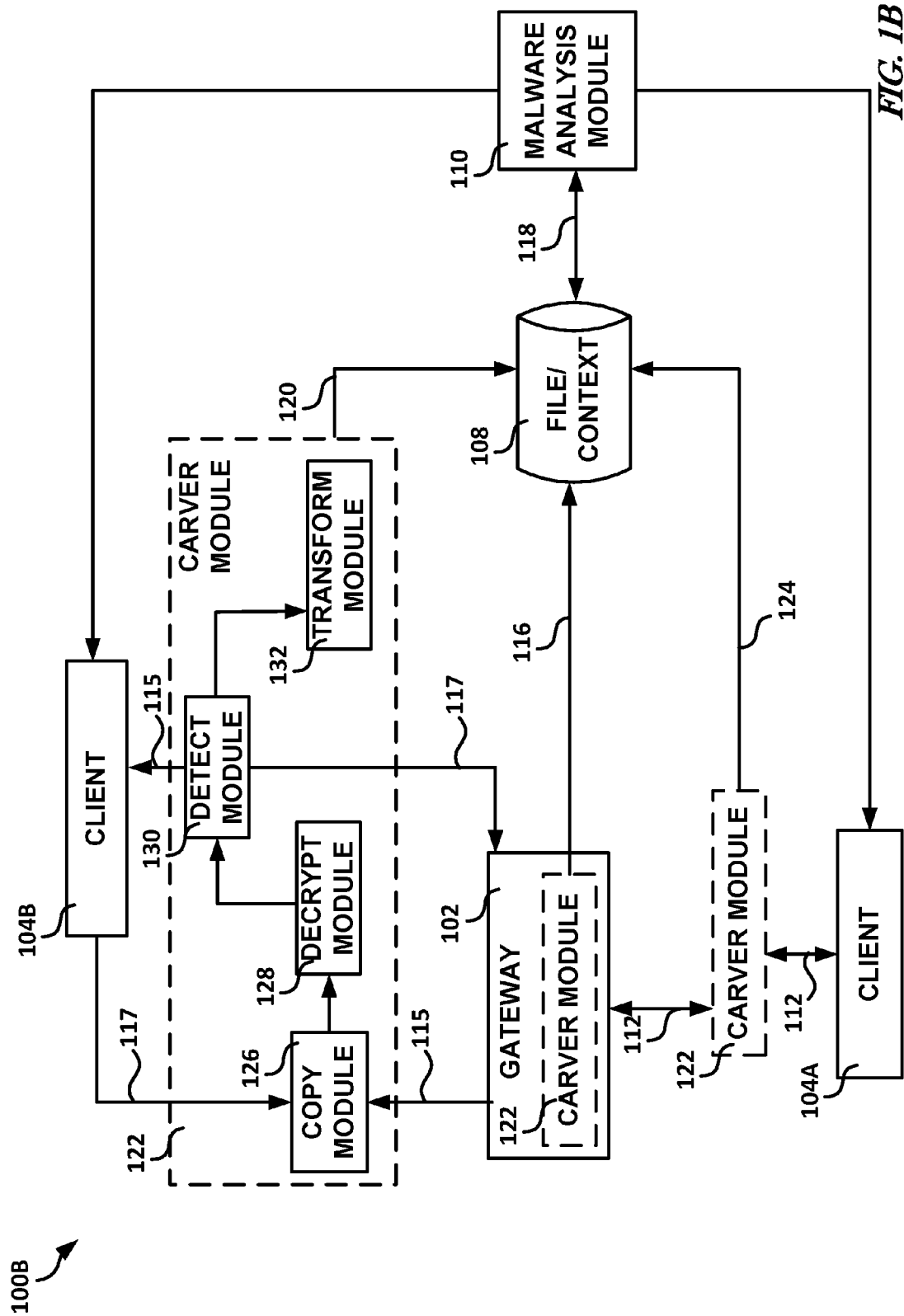
FIG. 1B illustrates, by way of example, a logical block diagram of an embodiment of another system for malware analysis of network traffic.

FIG. 1B illustrates, by way of example, a block diagram of an embodiment of another system 100B for malware analysis. The system 100B is similar to the system 100A with the system 100B configured to extract network data traffic from a network data stream before forwarding the traffic to the client 104A-B. The system 100B includes the same items as the system 100A, but with a different configuration of modules in the carver module 122 and additional connections 115 and 117 to/from the carver module 122. Instead of having the copy module 126 forward the network data to the client 104B without regard to the content of the network data, the system 100B includes detect module 130 between the copy module 126 and the client 104B on both data paths as defined by connections 115 and connections 117, respectively.

The network data from the client 104B is copied by the copy module 126, decrypted by the decrypt module 128 (if necessary), and analyzed by the detect module 130 before forwarding to the client 104B, gateway 102, or the client 104A. If the detect module 130 identifies that the network traffic data includes a specified property, that data corresponding to the property can be removed from the network data stream without being forwarded to the client 104A-B. The data that does not include the specified property can be forwarded to the client 104A-B, such as before malware analysis. The traffic that does not include the specified property may or may not be stored in the file/context database 108, such as for subsequent malware analysis by the malware analysis module 110. The traffic that does include the specified property is stored in the file/context module 108 for subsequent malware analysis by the malware analysis module 110.

If traffic is extracted from the network data stream and is later determined to not include malware, the traffic can be provided to the client 104A-B, such as by the malware analysis module 110. If traffic is not extracted from the network data stream and is later determined to include malware, the malware analysis module 110 can provide a communication to the client 104A-B. The communication can indicate what includes malware and/or a remedial action to be taken, such as to help alleviate the effects of the malware.

In embodiments configured as in FIG. 1B, the detect module 130 controls whether data is forwarded to the client 104A-B. The detect module 130, in one or more embodiments, can receive a decrypted version of the data as well as an undecrypted version of the data or two copies of the data in embodiments in which no decryption is necessary. If the data includes a specific property, the detect module 130 can extract that data from the data stream and prevent a copy of that data from being provided to the client 104A-B. If the data does not include the specific property, the detect module 130 can forward the data towards the client 104A-B.

Figure 2:
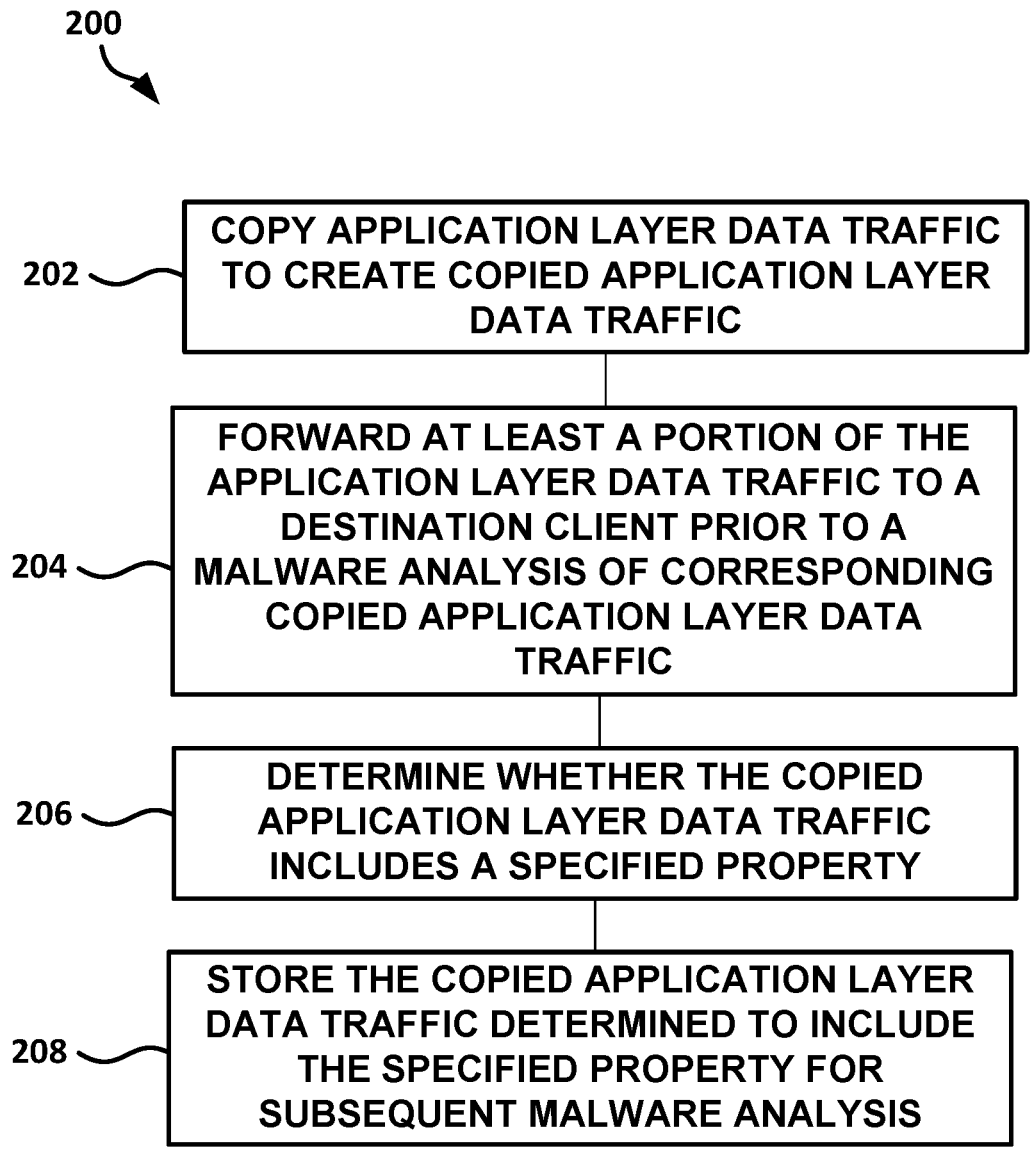
FIG. 2 illustrates, by way of example, a diagram of an embodiment of a method for malware analysis of network traffic.

FIG. 2 illustrates, by way of example, a flowchart of an embodiment of a method 200 for malware analysis of network data traffic. The method 200 as illustrated includes copying application layer data traffic to create copied application layer data traffic, at operation 202; forwarding at least a portion of the application layer data traffic to a destination client prior to a malware analysis of corresponding copied application layer data traffic, at operation 204; determining whether the copied application layer data traffic includes a specified property, at operation 206; and storing the copied application layer data traffic determined to include the specified property for subsequent malware analysis, at operation 208.

The specified property can be a property that identifies the traffic as email traffic (e.g., with or without an attachment) or identifies the traffic as a file or some other traffic that can include malware. The operation at 208 can be performed in response to a determination that the copied application layer data traffic includes the specified property. The stored copied application layer data traffic can include context data of the copied application layer data traffic. Further include extracting a context of the email from the traffic including extracting at least one of a sender identity, receiver identity, time, subject of the email, a copy contact, a blind copy contact, a content of a message of the email, other header information of the email, and/or metadata of the email.

The method 200 can further include sessionizing the copied application layer data traffic prior to determining whether the copied application layer data traffic includes the specified property and wherein storing the copied application layer data traffic includes storing the sessionized copied application layer data traffic. The sessionized copied application layer data traffic includes content of the email as well as context of the email including two or more of a sender address, a recipient address, a send port, a receive port, a sender identity, a recipient identity, a time of transmission, a copy contact, a blind copy contact, a subject line content, an author, and time of creation.

The method 200 can further include decrypting the copied application layer data traffic prior to determining if the copied application layer data traffic includes the specified property. The method 200 can further include converting the sessionized copied application layer data traffic into a format compatible with a malware analysis module before storing the sessionized copied application layer data traffic. The format compatible with the malware analysis module includes a Message Transfer Agent (MTA) format or other sendmail format.

The method 200 can further include extracting data that includes the specified property from the application layer data traffic and forwarding the extracted data after the malware analysis indicates that the extracted data does not include malware. In one or more embodiments, the application layer data traffic is communicated between a client and a gateway such that the application layer data traffic of the client is copied prior to being received at the gateway.

Figure 3:
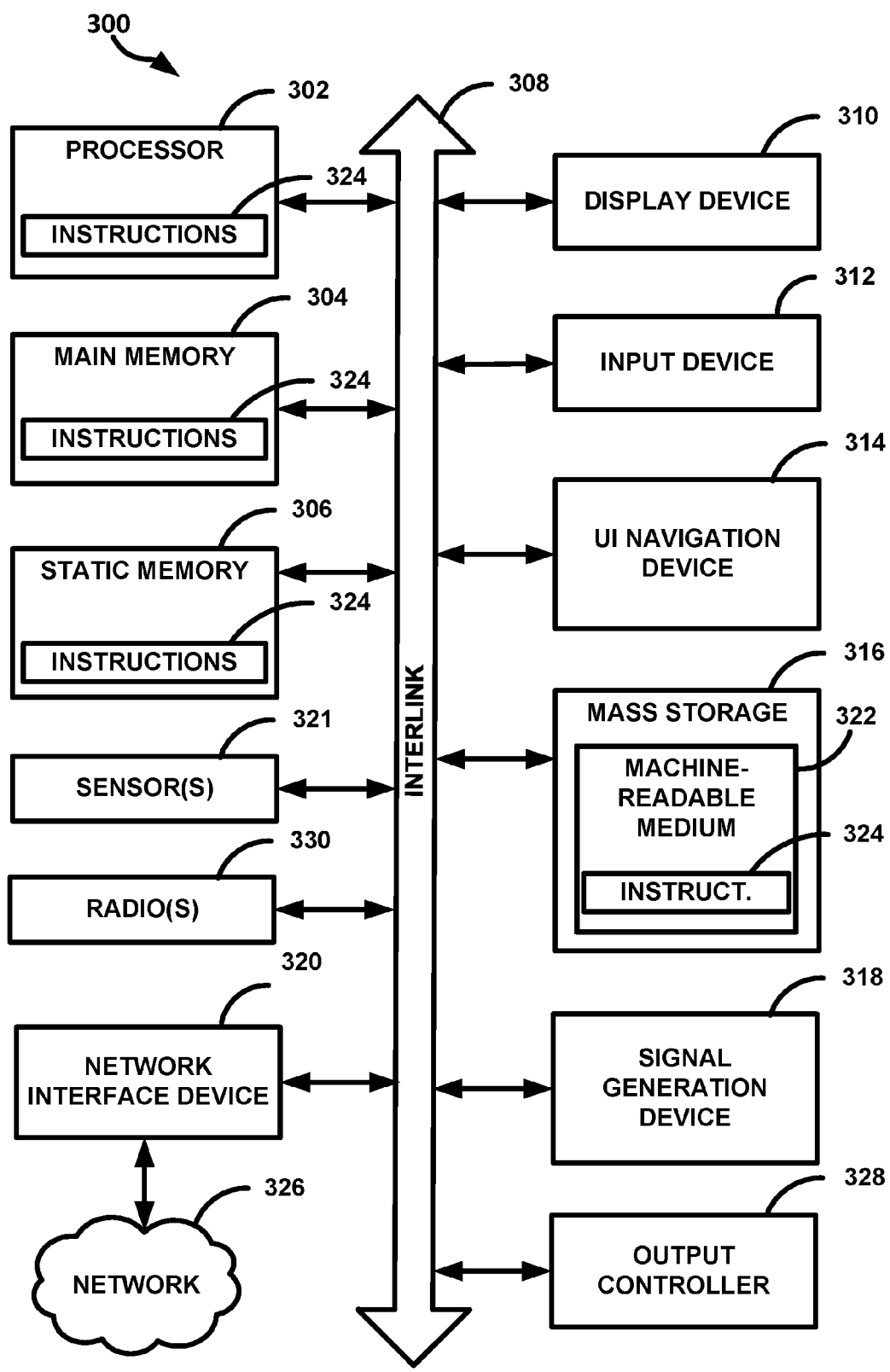
FIG. 3 illustrates, by way of example, a diagram of an embodiment of processing circuitry on which one or more of the methods and/or processes discussed herein may be performed.

FIG. 3 illustrates, by way of example, a block diagram of an embodiment of a machine 300 on which one or more of the operations as discussed herein can be implemented. The machine 300 can include a computing device instantiated as a compute device or server. The machine 300 may be employed to host or be integral to hardware, software, and/or firmware that performs malware analysis. One or more of the client 104A-B, the carver module 122, the gateway 102, the database 108, the malware analysis module 110, the copy module 126, the decrypt module 128, the detect module 130, and the transform module 132 can include one or more of the items of the machine 300. In one or more embodiments, one or more of the client 104A-B, the carver module 122, the gateway 102, the database 108, the malware analysis module 110, the copy module 126, the decrypt module 128, the detect module 130, and the transform module 132 can be implemented using one or more items of the machine 300. In alternative embodiments, the machine 300 operates as a standalone device or may be connected (e.g., networked) to other machines. In a networked deployment, the machine 300 may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 300 includes a processor 302 (e.g., a central processing unit (CPU), a graphics processing unit (GPU) or both), a main memory 304 and a static memory 306, which communicate with each other via a bus 308. The machine 300 may further include a video display unit 310 (e.g., a liquid crystal display (LCD) or a cathode ray tube (CRT)). The machine 300 may include an alphanumeric input device 312 (e.g., a keyboard), a user interface (UI) navigation device 314 (e.g., a mouse), a disk drive unit 316, a signal generation device 318 (e.g., a speaker) and a network interface device 320.

The memory 304 or 306 are examples of a storage device that can include instructions stored thereon that are executed by a machine, such as a processor or other processing circuitry, and cause the machine to perform operations. The storage device can be programmed and maintained prior to its inclusion in a system. The instructions and other information can be encrypted or otherwise protected by one or more security measures, such as to help protect the operational boundaries and other data stored thereon.

The disk drive unit 316 as illustrated includes a machine-readable medium 322 on which is stored one or more sets of instructions and data structures (e.g., software) 324 embodying or utilized by any one or more of the methodologies or operations described herein. The instructions 324 may also reside, completely or at least partially, within the main memory 304 and/or within the processor 302 during execution thereof by the machine 300, the main memory 304 and the processor 302 also including machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C. C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable execution units (e.g., transistors, logic gates (e.g., combinational and/or state logic), circuits, or other electric or electronic components) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The modules can be implemented with the division of operations as explained herein or the division of operations can be different such that a single module implements one or more of the operations of two or more of the modules or multiple modules implement the operations of one of the modules.

EXAMPLES AND ADDITIONAL NOTES

Example 1 can include or use subject matter (such as an apparatus, a method, a means for performing operations, or a machine readable storage device including instructions stored thereon that, when performed by the machine, can cause the machine to perform operations), such as can include or use copying application layer data traffic to create copied application layer data traffic, forwarding at least a portion of the application layer data traffic to a destination client prior to a malware analysis of corresponding copied application layer data traffic, determining whether the copied application layer data traffic includes a specified property, and in response to a determination that the copied application layer data traffic includes the specified property, storing the copied application layer data traffic determined to include the specified property for subsequent malware analysis, the stored copied application layer data traffic including context data of the copied application layer data traffic.

Example 2 can include or use, or can optionally be combined with the subject matter of Example 1, to include or use, wherein the specified property is data indicating that the application layer data traffic is one or more of electronic mail (email) traffic that includes an attachment, a file, and an executable.

Example 3 can include or use, or can optionally be combined with the subject matter of at least one of Examples 1-2, to include or use sessionizing the copied application layer data traffic prior to determining whether the copied application layer data traffic includes the specified property and wherein storing the copied application layer data traffic includes storing the sessionized copied application layer data traffic.

Example 4 can include or use, or can optionally be combined with the subject matter of Example 3, to include or use, wherein the sessionized copied application layer data traffic includes content of an email as well as context of the email including two or more of a sender address, a recipient address, a send port, a receive port, a sender identity, a recipient identity, a time of transmission, a copy contact, a blind copy contact, a subject line content, an author, and time of creation.

Example 5 can include or use, or can optionally be combined with the subject matter of at least one of Examples 1-4, to include or use decrypting the copied application layer data traffic prior to determining if the copied application layer data traffic includes the specified property.

Example 6 can include or use, or can optionally be combined with the subject matter of at least one of Examples 1-5, to include or use converting the sessionized copied application layer data traffic into a format compatible with a malware analysis module before storing the sessionized copied application layer data traffic.

Example 7 can include or use, or can optionally be combined with the subject matter of Example 6, to include or use, wherein the format compatible with the malware analysis module includes a Message Transfer Agent (MTA) format.

Example 8 can include or use, or can optionally be combined with the subject matter of at least one of Examples 1-7, to include or use, wherein the instructions for determining whether the copied application layer data traffic includes a specified property include instructions for decoding a multipurpose internet mail extension (MIME) header to determine the specified property.

Example 9 can include or use subject matter (such as an apparatus, a method, a means for performing operations, or a machine readable storage device including instructions stored thereon that, when performed by the machine, can cause the machine to perform operations), such as can include or use a first hardware module communicatively situated between an originating client and a destination client, the first hardware module to copy the application layer data traffic to create copied application layer data traffic, forward at least a portion of the application layer data traffic to the destination client prior to a malware analysis of corresponding copied application layer data traffic, determine whether the copied application layer data traffic includes a specified property, and in response to a determination that the copied application layer data traffic includes the specified property, store the copied application layer data traffic determined to include the specified property for subsequent malware analysis, the stored copied application layer data traffic including context data of the copied application layer data traffic, and a second hardware module to perform a malware analysis on the stored copied application layer data traffic.

Example 10 can include or use, or can optionally be combined with the subject matter of Example 9, to include or use the destination client, a network gateway to route application layer data traffic from the originating client towards the destination client, and wherein the second hardware module is further to provide a communication to the destination client in response to a determination that the stored copied application layer data traffic includes malware.

Example 11 can include or use, or can optionally be combined with the subject matter of at least one of at least one of Examples 9-10, to include or use, wherein the first hardware module is further to determine whether the copied application layer data traffic includes a specified property wherein determining whether the copied application layer data traffic includes a specified property includes decoding a multipurpose internet mail extension (MIME) header to determine the specified property.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A non-transitory machine-readable storage device including instructions stored thereon that, when executed by processing circuitry of a machine, configure the processing circuitry to perform operations comprising:
   copying application layer data traffic to create copied application layer data traffic;
   forwarding at least a portion of the application layer data traffic to a destination client prior to a malware analysis of corresponding copied application layer data traffic;
   determining whether the copied application layer data traffic includes a specified property; and
   in response to a determination that the copied application layer data traffic includes the specified property, storing the copied application layer data traffic determined to include the specified property for subsequent malware analysis, the stored copied application layer data traffic including context data of the copied application layer data traffic.

2. The storage device of claim 1, wherein the specified property is data indicating that the application layer data traffic is one or more of electronic mail (email) traffic that includes an attachment, a file, and an executable.

3. The storage device of claim 2, further comprising instructions stored thereon that, when executed by processing circuitry of the machine, configure the processing circuitry to perform operations comprising:
   sessionizing the copied application layer data traffic prior to determining whether the copied application layer data traffic includes the specified property and wherein storing the copied application layer data traffic includes storing the sessionized copied application layer data traffic.

4. The storage device of claim 3, wherein the sessionized copied application layer data traffic includes content of the email as well as context of the email including two or more of a sender address, a recipient address, a send port, a receive port, a sender identity, a recipient identity, a time of transmission, a copy contact, a blind copy contact, a subject line content, an author, and time of creation.

5. The storage device of claim 4, further comprising instructions stored thereon that, when executed by processing circuitry of the machine, configure the processing circuitry to perform operations comprising:
   decrypting the copied application layer data traffic prior to determining if the copied application layer data traffic includes the specified property.

6. The storage device of claim 4, further comprising instructions stored thereon that, when executed by processing circuitry of the machine, configure the processing circuitry to perform operations comprising:
   converting the sessionized copied application layer data traffic into a format compatible with a malware analysis module before storing the sessionized copied application layer data traffic.

7. The storage device of claim 6, wherein the format compatible with the malware analysis module includes a Message Transfer Agent (MTA) format.

8. The storage device of claim 4, wherein the instructions for determining whether the copied application layer data traffic includes a specified property include instructions for decoding a multipurpose internet mail extension (MIME) header to determine the specified property.

9. A method for malware analysis performed by one or more hardware processors, the method comprising:
   copying application layer data traffic to create copied application layer data traffic;
   forwarding at least a portion of the application layer data traffic to a destination client prior to a malware analysis of corresponding copied application layer data traffic;
   determining whether the copied application layer data traffic includes a specified property; and in response to a determination that the copied application layer data traffic includes the specified property, storing the copied application layer data traffic determined to include the specified property for subsequent malware analysis, the stored copied application layer data traffic including context data of the copied application layer data traffic.

10. The method of claim 9, wherein the specified property is data indicating that the application layer data traffic is electronic mail (email) traffic that includes an attachment.

11. The method of claim 10, further comprising:
sessionizing the copied application layer data traffic prior to determining whether the copied application layer data traffic includes the specified property and wherein storing the copied application layer data traffic includes storing the sessionized copied application layer data traffic.

12. The method of claim 11, wherein the sessionized copied application layer data traffic includes content of the email as well as context of the email including two or more of a sender address, a recipient address, a send port, a receive port, a sender identity, a recipient identity, a time of transmission, a copy contact, a blind copy contact, a subject line content, an author, and time of creation.

13. The method of claim 12, further comprising:
decrypting the copied application layer data traffic prior to determining if the copied application layer data traffic includes the specified property.

14. The method of claim 12, further comprising:
converting the sessionized copied application layer data traffic into a format compatible with a malware analysis module before storing the sessionized copied application layer data traffic.

15. The method of claim 14, wherein the format compatible with the malware analysis module includes a Message Transfer Agent (MTA) format.

16. The method of claim 12, wherein determining whether the copied application layer data traffic includes a specified property includes decoding a multipurpose internet mail extension (MIME) header to determine the specified property.

17. The method of claim 12, wherein the application layer data traffic is communicated between a client and a gateway such that the application layer data traffic of the client is copied prior to being received at the gateway.

18. A system comprising:
a first hardware module communicatively situated between an originating client and a destination client, the first hardware module to:
copy the application layer data traffic to create copied application layer data traffic;
forward at least a portion of the application layer data traffic to the destination client prior to a malware analysis of corresponding copied application layer data traffic;
determine whether the copied application layer data traffic includes a specified property; and
in response to a determination that the copied application layer data traffic includes the specified property, store the copied application layer data traffic determined to include the specified property for subsequent malware analysis, the stored copied application layer data traffic including context data of the copied application layer data traffic; and
a second hardware module to perform a malware analysis on the stored copied application layer data traffic.

19. The system of claim 18, further comprising:
the destination client;
a network gateway to route application layer data traffic from the originating client towards the destination client; and
wherein the second hardware module is further to provide a communication to the destination client in response to a determination that the stored copied application layer data traffic includes malware.

20. The system of claim 18, wherein the first hardware module is further to determine whether the copied application layer data traffic includes a specified property including decoding a multipurpose internet mail extension (MIME) header to determine the specified property.

* * * * *

UNITED STATES PATENT AND TRADEMARK OFFICE
CERTIFICATE OF CORRECTION

PATENT NO. : 9,882,924 B2
APPLICATION NO. : 15/063705
DATED : January 30, 2018
INVENTOR(S) : McDougal et al.

Page 1 of 1

It is certified that error appears in the above-identified patent and that said Letters Patent is hereby corrected as shown below:

In the Specification

In Column 2, Line 29, delete "Word." and insert --Word,-- therefor

In Column 2, Line 60, delete "(IP)." and insert --(IP),-- therefor

In Column 5, Line 30, delete "".pdf"." and insert --".pdf",-- therefor

In Column 5, Line 30, delete "".docx"." and insert --".docx",-- therefor

In Column 5, Line 31, delete "".wav"." and insert --".wav",-- therefor

In Column 5, Line 31, delete "".dmg"." and insert --".dmg",-- therefor

In Column 5, Line 32, delete "".gfx"." and insert --".gfx",-- therefor

In Column 5, Line 32, delete "".mp3"." and insert --".mp3",-- therefor

In Column 6, Line 18, delete "108" and insert --110-- therefor

In Column 7, Line 26, delete "module" and insert --database-- therefor

In Column 10, Line 39, delete "herein." and insert --herein,-- therefor

Signed and Sealed this
Fourth Day of June, 2019

Andrei Iancu
*Director of the United States Patent and Trademark Office*